Patented Nov. 11, 1924.

1,514,912

UNITED STATES PATENT OFFICE.

BETHUNE G. KLUGH, OF ANNISTON, ALABAMA, ASSIGNOR TO FEDERAL PHOSPHORUS COMPANY, OF BIRMINGHAM, ALABAMA, A CORPORATION OF ALABAMA.

PROCESS FOR THE FIXATION OF PHOSPHORIC ACID.

No Drawing.   Application filed October 20, 1920.   Serial No. 418,324.

*To all whom it may concern:*

Be it known that I, BETHUNE G. KLUGH, a citizen of the United States of America, residing at Anniston, in the county of Calhoun and State of Alabama, have invented certain new and useful Improvements in Processes for the Fixation of Phosphoric Acid, of which the following is a specification.

My invention relates to the fixation of phosphoric acid as evolved in the smelting of natural phosphates by combining it with ammonia directly as produced, and the collection of the resultant ammonium phosphate in one continuous operation, as well as the conservation of the heat value of the reducing gases from said phosphate smelting.

My invention further contemplates the fixation and collection of phosphoric acid and potassium, by combining the two constituents as evolved together from the smelting of natural phosphates and potassium bearing silicate rocks, with ammonia directly as produced and the collection of a resultant product of ammonium, potassium and phosphorus compounds, in a continuous operation, and likewise conserving the heat value of the reducing gases evolved from said smelting of natural phosphates and potassium bearing rocks.

It has for its object the simplification of the procedure in the fixation and collection of phosphoric acid, as well as that of the fixation and collection of ammonia in the existent state of the art, and also the lowering of the total cost of production of the phosphoric acid, ammonia and potassium constituents of fertilizers.

While the products of this process are principally useful as fertilizers, the hereindescribed process may be so conducted as to produce compounds of the aforesaid constituents directly available for other chemical uses.

A very large amount of the ammonia at present produced is derived from coal distillation as in the well known by-product coking plants. The principal method by which this ammonia is fixed for fertilizer, or other subsequent chemical uses, is by combining it with sulphuric acid to form sulphate of ammonia. The sulphuric acid has no value as a fertilizer, but is used as an element with which to combine the fertilizing element, ammonia, and place it in tangible form for handling, marketing and distributing. Thus the great cost of producing, handling and transporting the sulphuric acid, as well as the cost of the freight and distribution of the sulphuric acid after its combination with the ammonia, must be borne by the ammonia value in the combined product.

On the other hand, if phosphoric acid, which is another fertilizing element be combined with the ammonia, it is necessary in the present state of the art, either to have the phosphoric acid produced and handled to the ammonia production plant or the ammonia produced and handled to the phosphoric acid production plant or both produced and handled to a common point for the combination of the two fertilizing elements.

It is a well known fact that the handling of ammonia liquor, or phosphoric acid as a liquid in any stage of dilution or concentration, requires special and expensive handling receptacles and equipment, involving great expense and capital investment.

Many processes have been proposed for the combining of ammonia and phosphoric acid, but all involve one or more of the foregoing procedures of handling, collecting and transporting one or both elements, as well as the expense of processing the ammonium phosphate.

In my application for Letters Patent, Serial No. 388,822, I have described definite controlling factors in the electrical smelting of phosphatic materials, which are essential to the commercial production of phosphoric acid in such electric smelting operation. In my application, Serial No. 388,821, I have described a selective process of oxidizing the phosphorus evolved in the electrical smelting of natural phosphates, without oxidation of the accompanying carbon monoxide. I propose to utilize the aforedescribed processes as a basis for the production of the phosphoric acid which forms one constituent of the hereindescribed process. Briefly stated, these processes contemplate charging into an electric furnace, a mixture of natural phosphate, siliceous flux and carbon, with the proportioning of said constituents so as to produce a slag with silica and lime in the molecular ratio of $3(CaO)—2(SiO_2)$, or a numerical ratio of 1 to 1.4, and the proportioning of the carbon in the mixture sufficient for direct carbon reduction of all the phosphorus and, when present, the iron oxide in the charge, the smelting of aforesaid proportioned mixture by the avoidance of open arcs, the maintenance of uniform temperatures in the hearth of the furnace or slag zone, preferably between 1200° and 1500° C., the diffusion of the electric heat through the slag bath or softened charges, the preservation of uniform depth of stock above the fusion zone, the automatic feed of stock, and the preservation of a combustion space in which the phosphorus is oxidized without the oxidation of the accompanying carbon monoxide by admitting to the furnace continuously, and in quantity sufficient to oxidize the phosphorus only, oxygen which is distributed uniformly through the evolved products as they emanate from the stock and while they are at the high temperature maintained by the oxidation process. The products of this process are phosphorus pentoxide and carbon monoxide. Starting with such products obtained preferably by the preliminary steps just described, I take the aforesaid mixture of carbon monoxide, nitrogen (if present) and phosphorus pentoxide and conduct said gaseous mixture, as evolved from the furnace into suitable mains and allow said mixtures of gases and fumes to come into contact with gases directly evolved from the distillation of coal, which latter gases have in the usually practiced methods, been freed from tar but still contain the gaseous ammonia mixed with the usual combustible gaseous mixture from such operation. The hydration of the phosphorus pentoxide to phosphoric acid may be effected before or after the admixture of the two respective groups of gases. The two aforesaid classes of gas mixtures coming in contact will permit the combination of the phosphoric acid with the ammonia, thus producing compounds of ammonium phosphate, and mixtures of various ammonium phosphates, according to the regulation of temperature of gases for their reaction, the proportion of phosphoric acid to the ammonia present, the relative proportions of water vapor present, and other features of regulation which will be practicable in the process. It is obvious that the products of combination consisting of the various compounds so formed of phosphoric acid and ammonia will be precipitated, from the perfect gases of the combined gaseous mixture, as a dry solid or powder, and said dry solid or powder may readily be separated from the perfect gases, by means of well known dust collecting or other separating devices.

The carbon monoxide evolved in the electric furnace, along with the small amount of nitrogen with the air which was introduced to oxidize the elemental phosphorus to phosphorus pentoxide, thus remains with combustible gases from the distillation of coal, and said perfect gas mixture being freed from solids, liquids, ammonia, phosphoric acid, and compounds thereof, is available for all uses which obtain for such combustible gases.

Thus by my process the carbon monoxide derived from the reduction of phosphorus is conserved and its full calorific value added to that of the gases from the distillation of coal, and from which the ammonia was derived.

Bearing in mind that it is essential to add a considerable amount of carbon, usually in the form of coke, to the charge of a smelting furnace to insure the liberation of the phosphorus content in the furnace charge, and that the carbon monoxide gases, heretofore evolved from such process and weighing more than twice the weight of the phosphorus produced, have been a waste product, being burned and wasted as carbon dioxide, it will be at once apparent that the conserving and utilizing by simple and practicable steps of so valuable a by-product is of great importance.

In Patent No. 1,194,077, patented Aug. 8th, 1916, by Wm. H. Ross, Albert R. Merz and John N. Carothers, a process is described wherein "gaseous ammonia" is allowed to come in contact with the evolved phosphorus fumes either in the oxidizing tower or in a suitable chamber succeeding this. They propose, therefore, to completely burn the carbon monoxide along with the phosphorus, to add gaseous ammonia to the gases from the electric furnace, and to subsequently collect the various ammonium phosphates in a dry way by dust collecting, baffling or other suitable means of separating dust from gases.

In my process, I differentiate from the above process and improve thereon by—

1. Providing for collection of the ammonia directly from the original source of production of the ammonia, thus eliminating the expense of the several steps in the process of collecting said ammonia either in aqueous solution or as anhydrous ammonia, as well as the handling, transportation and regasifying the same preparatory to its admission into the chambers carrying the phosphoric acid bearing gases.

2. Avoiding the combustion of the carbon monoxide and the resultant additional heating of the gases which must be cooled before treatment.

3. Conserving the heat value of the carbon monoxide evolved with phosphorus from which the phosphoric acid as above described was produced, and maintaining said carbon monoxide in form suitable for use as a fuel gas.

4. Making available a method of fixing the ammonia in by-product coal distillation gases, said patented process being not available for such use because (1) if the carbon monoxide is burned to carbon dioxide without an excess of air, such carbon dioxide gas being inert, will dilute and thus reduce the value of such coal distillation gases, (2) if the carbon dioxide is accompanied by an excess of oxygen, as will usually be the case in a commercial operation, such carbon dioxide and oxygen will on admixture with the coal distillation gases form an explosive gas mixture.

A number of variations and details of control of the above described process are possible, with the resultant selective production of various ammonium phosphates. The elements of control governing the ammonium phosphate, which will be formed, such as ammonium meta-phosphate, ammonium pyro-phosphate, ammonium ortho-phosphate, or the mono-ammonium, diammonium or tri-ammonium, salts of the above phosphate radicals, and furthermore that governing of the physical state or aggregate of the product as separated from the gases after their reaction, will be:—

The temperature of the ammonia bearing gases as brought into contact with the phosphorous bearing gases.

The temperature of the phosphorus bearing gases as brought into contact with the ammonia bearing gases.

The temperature of the mixture of the two gases, during the period of reaction.

The proportion of water vapor to ammonia present in the ammonia bearing gases as brought into contact with the phosphorus bearing gases.

The proportion of water vapor to phosphoric acid in the phosphorus bearing gases as brought into contact with the ammonia bearing gases.

The proportion of water vapor present to that of both ammonia and phosphoric acid, in the mixed gases during the period of this reaction.

The velocity of the current of the two above gases, while passing through the reacting chamber, which velocity in turn is governed by the volume of all gases, and capacity of the gas chamber in which the reaction occurs.

The proportion of phosphoric acid to ammonia in the reacting gases.

I propose in carrying out my invention to provide for the control of all the above governing factors, by providing for the regulation of temperature and water vapor content of both the ammonia bearing gases and the phosphorus bearing gases, prior to their being brought into contact one with the other, and for the separate temperature control and water vapor control of the two reacting gases after they are brought into contact. These control features may be accomplished by well known and even automatic methods for the regulation of the temperature and of the water vapor content of the gases both before and after they come together. In the production of any predetermined specific compound, it is desirable that such control be made constantly adjustable, on account of the variability of the raw materials commercially available for the conducting of the process. However in carrying out my invention, I do not wish to confine myself to the production of specific compounds to the exclusion of others.

In my accompanying application for Letters Patent upon a process for the smelting of a mixture of natural phosphates, potassium bearing shale and carbon, with or without the addition of iron for the production of ferro-phosphorus, and the volatilization of phosphorus with potassium compounds, the oxidation of said volatilized phosphorus and the collection of the phosphoric acid and potassium compounds simultaneously from the gases evolved from said furnace operation, I have described a process in which gases emanating from said furnace will be analogous to that of the gases emanating from a furnace in which natural phosphates, silicious flux and carbon are treated, except that in case of the smelting of the natural phosphates, potassium bearing shale and carbon, there will be a fume consisting of potassium compounds accompanying the gases as well as phosphorus and carbon monoxide. The restricted oxidation of the phosphorus to phosphorus pentoxide without the oxidation of the carbon monoxide will be conducted in the same way as that hereinbefore described as it will not be influenced by the presence of the potassium compounds present with the said gases.

In either case, the relative weights of carbon monoxide and phosphorus will be the same. This is obviously due to the fact that the carbon is added to the mixture in the necessary ratio to reduce the phosphorus charged and as such has no effect upon the behavior of the potassium compounds under action of the furnace operation.

Now the gases emanating from said furnace and containing potassium compounds as above described, in addition to the phosphorus pentoxide and carbon monoxide can be conducted into and by contact therewith be allowed to react with the ammonia bearing gases from the distillation of coal in the same way and in the same type of apparatus as that used for the reaction of gases as aforedescribed, but which do not contain the potassium compounds.

The principal difference is that in the latter case there will be formed potassium and ammonium compounds of phosphoric acid, and mixtures of potassium and ammonium compounds. In any case the product will be subject to similar control to that described for phosphoric acid and ammonium compounds alone and will produce a complete fertilizer containing the three elemental fertilizing constituents, viz.: phosphoric acid, potassium and ammonia, in a physical and chemical state ready for the market.

I further contemplate that ammonia, other than that contained directly in coal distillation gases, may be conducted into the phosphorus oxide bearing gases directly from the smelting of phosphatic materials, in which gases the carbon monoxide as evolved has not been oxidized by the hereinbefore described selective oxidation process and the ammonia and phosphoric acid thus combined in like manner to that heretofore described, with the separation thereof from the carbon monoxide, thus leaving the latter available as such in a free and substantially clean state for use in heating, chemical reduction, or other uses for which carbon monoxide is desirable.

If oxygen in the pure state without the admixture of nitrogen, as in air, has been used for the hereinbefore described restricted and selective process of oxidation of the phosphorus as evolved from the furnace charge in the electrical smelting of natural phosphates, the carbon monoxide will be substantially pure and available for use as such for high temperature gas heating, of for more refined chemical reduction processes.

For instance, in the production of ammonia from cyanamide, which in turn is produced by combining substantially pure nitrogen with calcium carbide, there are large quantities or oxygen available in the free state by its separation from the nitrogen of the air. Now, if this oxygen be used for the hereinbefore described process of selective oxidization of the phosphorus, as evolved in the electric smelting of natural phosphates, leaving the accompanying carbon monoxide unoxidized, and the resulting phosphoric acid fixed by the ammonia produced from the cyanamide, then the pure carbon monoxide after the separation therefrom of the ammonia and phosphoric acid compounds, may be used for calcining the lime for the production of calcium carbide. A great reciprocal advantage is thus available in the production of ammonia by the well known cyanamide process and the production of phosphoric acid by the electrical smelting of natural phosphates in contiguous plants and the chemical combination and fixation of the ammonia and phosphoric acid so produced, by conducting the ammonia as made from the cyanamide into the gases from the phosphate smelting in which only the phosphorus has been oxidized. This will effect great saving by the conservation of the heat value of the carbon monoxide, as well as preserve it in a substantially pure state for chemical reduction uses about the same plant.

Having thus described my invention, what I claim as new and desire to secure by Letters Patent, is:—

1. The hereindescribed process, which consists in bringing ammonia into contact with phosphorus oxide fumes in the presence of carbon monoxide gas with which it was evolved, and the separation of the compounds of ammonia and phosphoric acid from said carbon monoxide.

2. The hereindescribed process, which consists in bringing ammonia into contact with phosphorus oxide fumes in the presence of the carbon monoxide gas with which it was evolved, and the separation of the compounds of ammonia and phosphoric acid from said carbon monoxide, and conserving the carbon monoxide for use.

3. The hereindescribed process for fixing ammonia present in reducing gases, which consists in conducting into such gases phosphoric acid in fume state.

4. The hereindescribed process, which consists in fixing ammonia by its admixture with carbon monoxide gas bearing phosphoric oxides.

5. The hereindescribed process for fixing ammonia from a gaseous state, which consists in admixing with it carbon monoxide gas bearing phosphoric oxides in fume state, and collecting the compounds of ammonia and phosphoric acid.

6. The hereindescribed process for fixing ammonia present in coal distillation gases, which consists in conducting such gases into carbon monoxide gas bearing phosphoric oxides, and separating the resultant compounds of ammonia and phosphoric acid.

7. The hereindescribed process, which consists in evolving phosphorus from the smelting of natural phosphates in the presence of a reducing agent, oxidizing the phosphorus as evolved without permitting the oxidation of the carbon monoxide evolved, and fixing the phosphorus pentoxide by conducting ammonia into the mixture of said evolved products.

8. The process according to claim 7, in which the resultant compounds of ammonia and phosphoric acid are separated as a dry powder from the carbon monoxide and collected.

9. The hereindescribed process, which consists in electrically smelting phosphatic material with a carbon reducing agent, oxidizing only the phosphorus in the products evolved therefrom, and conducting ammonia into said mixture of phosphorus pentoxide fumes and carbon monoxide, and separating the compounds of ammonia and phosphoric acid by a dry process from the accompanying carbon monoxide.

10. The hereindescribed process, which consists in electrically smelting phosphatic material with a carbonaceous reducing agent, oxidizing only the phosphorus in the gases evolved therefrom, and conducting said evolved products into ammonia bearing gases as derived from coal distillation.

11. The hereindescribed process for the production of a concentrated fertilizer containing combined nitrogen and phosphorus, which consists in causing ammonia bearing gases from coal distillation to come into contact with phosphorus bearing gases evolved from the smelting of natural phosphates, the phosphorus in which phosphorus bearing gases has been selectively oxidized without the oxidation of the accompanying carbon monoxide, and separating and conserving the compounds of ammonia and phosphoric acid and the carbon monoxide.

12. The hereindescribed process, which consists in evolving gases bearing oxides of potassium and phosphorus in a fume state, mixing them with gases containing ammonia, and separating the resultant compounds of ammonia, potassium and phosphoric acid from the residual gases.

13. The hereindescribed process, which consists in fixing ammonia by its admixture with carbon monoxide gas bearing the oxides of phosphorus and potassium, and separating compounds and mixtures of phosphoric acid, ammonia and potassium, as formed, from the accompanying carbon monoxide.

14. The hereindescribed process, which consists in fixing ammonia by causing ammonia bearing gases from the distillation of coal to come into contact with carbon monoxide gas bearing the oxides of phosphorus and potassium, and separating the compounds and mixtures of phosphoric acid, ammonia and potassium, as formed, from the accompanying carbon monoxide and coal distillation gases.

15. A process for fixing gaseous ammonia as produced from coal distillation, which consists in conducting the tar freed non-condensible gases from said coal distillation operation into contact with gases volatilized from the smelting of natural phosphates, siliceous flux and carbon, in which latter gases the elemental phosphorus so volatilized is oxidized to phosphorus pentoxide without the oxidation of the accompanying carbon monoxide, causing the phosphoric acid and ammonia to react in the two mixed gases, and separating the resultant dry ammonia and phosphoric acid compounds from the mixture of the carbon monoxide and residual coal gases, substantially as described.

16. A process for the production of compounds of ammonia and phosphoric acid, which process consists in the smelting of natural phosphates with siliceous flux and carbon, the volatilization of elemental phosphorus and carbon monoxide, the oxidation of the elemental phosphorus, the conducting of the resultant mixture of phosphorus pentoxide fume, carbon monoxide and nitrogen into contact with ammonia bearing gases from coal distillation, adding water vapor and allowing the ammonia, phosphorus pentoxide and water vapor to react, thus forming ammonia and phosphoric acid compounds, and separating the solid dry compounds of ammonia and phosphoric acid so formed from said combustible gases leaving the latter cleaned and ready for use as combustible gases, substantially as described.

17. A process for the production of compounds of ammonia, potassium and phosphoric acid, consisting in the smelting in a furnace of a charge of natural phosphates, potassium bearing shale in proportion to the fluxing requirements of the natural phosphates, and carbon in proper proportion to the reducing requirements of the natural phosphates, volatilizing by said smelting elemental phosphorus, potassium oxides and other compounds, and carbon monoxide, oxidizing the elemental phosphorus selectively and without oxidation of the carbon monoxide, conducting the resulting gas mixture into contact with ammonia bearing gases from coal distillation, causing the ammonia, potassium and phosphoric acid to react to form the resultant compounds, and separating the dry, concentrated and marketable compounds of ammonia, potassium and phosphoric acid from the combustible gas mixture.

18. A process for the production of compounds of ammonia, potassium and phosphoric acid, consisting in the smelting of a charge of natural phosphates, potassium bearing shale in proportion to the fluxing requirements of the natural phosphates, and carbon in proper proportion to the reducing requirements of the natural phosphates, volatilizing by said smelting elemental phosphorus, potassium oxides and other compounds, and carbon monoxide, oxidizing the elemental phosphorus selectively and without oxidation of the carbon monoxide, conducting the resultant gas mixture into contact with ammonia bearing gases from coal distillation, causing the ammonia, potassium and phosphoric acid to react to form the resultant compounds, separating the dry, concentrated and marketable compounds of ammonia, potassium and phosphoric acid from the combustible gas mixture, and passing the cleaned combustible gases into mains ready for use as such, substantially as described.

In testimony whereof I affix my signature.

BETHUNE G. KLUGH.

Witness:
NOMIE WELSH.